(12) United States Patent
Sugiyama et al.

(10) Patent No.: US 7,882,755 B2
(45) Date of Patent: Feb. 8, 2011

(54) SENSOR ATTACHMENT DEVICE, A SENSOR AND A LIGHT EMITTING DEVICE FOR A PHOTO-ELECTRICAL SENSOR

(75) Inventors: Kazutoshi Sugiyama, Osaka (JP); Noriyoshi Yamane, Osaka (JP)

(73) Assignee: Keyence Corporation, Osaka (JP)

( * ) Notice: Subject to any disclaimer, the term of this patent is extended or adjusted under 35 U.S.C. 154(b) by 454 days.

(21) Appl. No.: 12/166,599

(22) Filed: Jul. 2, 2008

(65) Prior Publication Data
US 2009/0025493 A1   Jan. 29, 2009

(30) Foreign Application Priority Data
Jul. 23, 2007   (JP) .............................. 2007-190728

(51) Int. Cl.
*G01D 21/00* (2006.01)
*H01J 40/14* (2006.01)

(52) U.S. Cl. ...................................... 73/866.5; 250/239
(58) Field of Classification Search ................ 73/866.5; 250/239
See application file for complete search history.

(56) References Cited

U.S. PATENT DOCUMENTS

| 4,704,524 A | 11/1987 | Masaki et al. | |
|---|---|---|---|
| 5,708,496 A | * 1/1998 | Barnett et al. | ................. 356/28 |
| 6,788,054 B2 | * 9/2004 | Collins et al. | ............... 324/262 |
| 7,205,530 B2 | * 4/2007 | Jones | ..................... 250/231.13 |
| 2006/0255251 A1 | * 11/2006 | Jones | ..................... 250/231.13 |

FOREIGN PATENT DOCUMENTS

| JP | H04-022510 Y | 5/1992 |
|---|---|---|
| JP | H04-022511 Y | 5/1992 |
| JP | H07-036339 U | 7/1995 |
| JP | 2581187 Y | 7/1998 |
| JP | 2854605 B | 11/1998 |
| JP | 2601616 Y | 10/1999 |

* cited by examiner

*Primary Examiner*—Hezron Williams
*Assistant Examiner*—Nathaniel Kolb
(74) *Attorney, Agent, or Firm*—Kilyk & Bowersox, P.L.L.C.

(57) ABSTRACT

This invention provides a sensor attachment device that can be easily attached and detached, a sensor and a light emitting device for a photo-electrical sensor. By downward displacement of an operation member after tip ends of a pair of locking hooks are locked to a sensor main body by inserting the sensor main body into an insertion opening with second regions of a pair of facing surfaces respectively facing toward external surfaces of central portions of the pair of locking hooks, the central portions of the pair of locking hooks can be pressed inwardly by first regions of the pair of facing surfaces, thereby fixing the sensor main body to a holding member. Accordingly, the attachment of the sensor main body is easy in comparison with the conventional configuration in which a nut is screwed onto the sensor main body, then rotated and fastened.

3 Claims, 16 Drawing Sheets

SENSOR ATTACHMENT DEVICE, A SENSOR AND A LIGHT EMITTING DEVICE FOR A PHOTO-ELECTRICAL SENSOR

The present application claims priority from Japanese Patent Application No. 2007-190728, filed Jul. 23, 2007, which is incorporated herein by reference.

BACKGROUND OF THE INVENTION

1. Field of the Invention

The present invention relates to a sensor attachment device, a sensor and a light emitting device for a photo-electrical sensor, and in particular, to an improvement of an attachment arrangement of a sensor main body and a light emitting device main body.

2. Description of the Related Art

One known method of fixing a sensor such as a photo-electrical sensor is to prepare a threaded sensor main body, attach a nut that is threaded so as to correspond to the thread of the sensor main body, and rotate the nut thereby attaching the sensor main body to a holding member that has been previously fixed to an installation position (refer to, e.g., Japanese Unexamined Utility Model Application Publication No. H7-36339).

FIG. 16 is a perspective view of one example of an attachment arrangement of a sensor main body 102 in a conventional sensor 101. In this example, an almost L-shaped holding member 103 is previously fixed at an installation position for the sensor 101, and the sensor main body 102 is attached to the holding member 103 by means of a nut 104. A portion of the sensor main body 102 forms an insertion portion 105 that is to be inserted into an opening (not shown) in the holding member 103, and a thread (not shown) is formed along an external surface around the insertion portion 105.

In attachment of the sensor main body 102 to the holding member 103, after inserting the insertion portion 105 of the sensor main body 102 into the opening of the holding member 103, the nut 104 that is threaded so as to correspond to the thread of the insertion portion 105 is screwed onto the insertion portion 105 from its tip. Then, the nut 104 is rotated and fastened so as to hold the holding member 103 between the nut 104 and the sensor main body 102, thereby firm attachment of the sensor main body 102 to the holding member 103 being established. In order to make holding and rotating of the nut 104 easier, a concavo-convex portion 106 is provided over an external surface of the nut 104.

However, the above described conventional attachment arrangement of the sensor main body 102 is cumbersome, because it requires inserting the insertion portion 105 of the sensor main body 102 into the opening of the holding member 103, screwing the nut 104 onto the insertion portion 105, and then rotating and fastening the nut 104. In particular, it becomes significantly cumbersome in such a case where a production line is provided with a number of sensors 101, because the above operations have to be repeated for each of the sensors 101.

Further, in a configuration in which the sensor main body 102 is attached to the holding member 103 by fastening the nut 104 as described above, the sensor main body 102 can adversely rotate to an angle that exceeds a desired angle due to a fastening torque occurring when fastening the nut 104. In this case, if the sensor is a photo-electrical sensor provided with a light emitting element and a photo-electrical element, for example, possible misalignment in a floodlight axis or a light-receiving axis prevents the sensor from performing favorable detection. Moreover, in a case in which the nut 104 is manually held and screwed, adjustment of the fastening torque becomes difficult and the sensor main body 102 can adversely jounce due to the lack of the fastening torque.

SUMMARY OF THE INVENTION

The present invention has been devised in view of the above circumstances, and it is an object of the present invention to provide a sensor attachment device that can be easily attached and detached, a sensor and a light emitting device for a photo-electrical sensor. A further object of the present invention is to provide a sensor attachment device capable of suppressing the error in attachment, a sensor and a light emitting device for a photo-electrical sensor.

A sensor attachment device according to a first aspect of the present invention includes: a holding member provided with an insertion opening into which a sensor main body is inserted, the holding member holding the sensor main body with the sensor main body inserted into the insertion opening; and an operation member that is attached to the holding member and fixes the sensor main body to the holding member by being displaced in an operational direction that crosses a direction along which the sensor main body is inserted, wherein the holding member is provided with a pair of locking hooks each extending toward the direction along which the sensor main body is inserted, tip ends of the pair of locking hooks being locked to the sensor main body inserted into the insertion opening, and the pair of locking hooks being either curved or flexed to protrude externally so that central portions of the pair of locking hooks are away from the sensor main body inserted into the insertion opening, the operation member is provided with a pair of facing surfaces, each facing toward an external surface of each of the central portions of the pair of locking hooks, the pair of facing surfaces each having a first region for fixing the sensor main body and a second region at which a distance between the facing surfaces is larger than that at the first region, and the sensor main body is capable of being inserted into the insertion opening with the second regions of the pair of facing surfaces respectively facing toward the external surfaces of the central portions of the pair of locking hooks, and the operation member is displaced in the operational direction with the sensor main body being inserted into the insertion opening to have the first regions of the pair of facing surfaces respectively face toward the external surfaces of the central portions of the pair of locking hooks, thereby pressing the central portions of the pair of locking hooks inwardly and fixing the sensor main body to the holding member.

According to such a configuration, only by the displacement of the operation member to a operational direction after the sensor main body is inserted into the insertion opening with the second regions of the pair of facing surfaces respectively facing toward the external surfaces of the central portions of the pair of locking hooks, the central portions of the pair of locking hooks can be pressed inwardly by the first regions of the pair of facing surfaces, thereby fixing the sensor main body to the holding member. Accordingly, the attachment of the sensor main body is easy in comparison with the conventional configuration in which a nut is screwed onto the sensor main body, then rotated and fastened.

Further, the tip ends of the pair of locking hooks are locked to the sensor main body to provide a temporary joint by inserting the sensor main body into the insertion opening with the second regions of the pair of facing surfaces respectively facing toward the external surfaces of the central portions of the pair of locking hooks. Alternatively, the tip ends of the pair of locking hooks are locked to the sensor main body to provide a temporary joint, with the pair of facing surfaces between the second regions and first regions facing the external surface of the central portions of the pair of locking hooks, by displacing the operation member to the operational direction after the sensor main body is inserted into the insertion opening. Because the sensor main body can be fixed by operating the operation member in such a state provided with the temporary joint, the sensor main body can be attached stably, thereby suppressing an attachment error, in comparison with the conventional configuration in which a nut is rotated to fix the sensor main body.

According to the present invention, only by the displacement of the operation member to the operational direction after the tip ends of the pair of locking hooks are locked to the sensor main body or a light emitting device main body by inserting the sensor main body or the light emitting device main body into the insertion opening with the second regions of the pair of facing surfaces respectively facing toward the external surfaces of the central portions of the pair of locking hooks, the central portions of the pair of locking hooks can be pressed inwardly by the first regions of the pair of facing surfaces, thereby fixing the sensor main body or the light emitting device main body to the holding member. Accordingly, the attachment of the sensor main body or the light emitting device main body is easy.

Further, according to the present invention, the tip ends of the pair of locking hooks are locked to the sensor main body or the light emitting device main body to provide a temporary joint by inserting the sensor main body or the light emitting device main body into the insertion opening with the second regions of the pair of facing surfaces respectively facing toward the external surfaces of the central portions of the pair of locking hooks. Because the sensor main body or the light emitting device main body can be fixed by operating the operation member after the temporary joint, the sensor main body or the light emitting device main body can be attached stably, thereby suppressing an attachment error.

DETAILED DESCRIPTION OF THE PREFERRED EMBODIMENTS

The present invention will now be described in detail with reference to preferred embodiment and the drawings.

Figure 1:
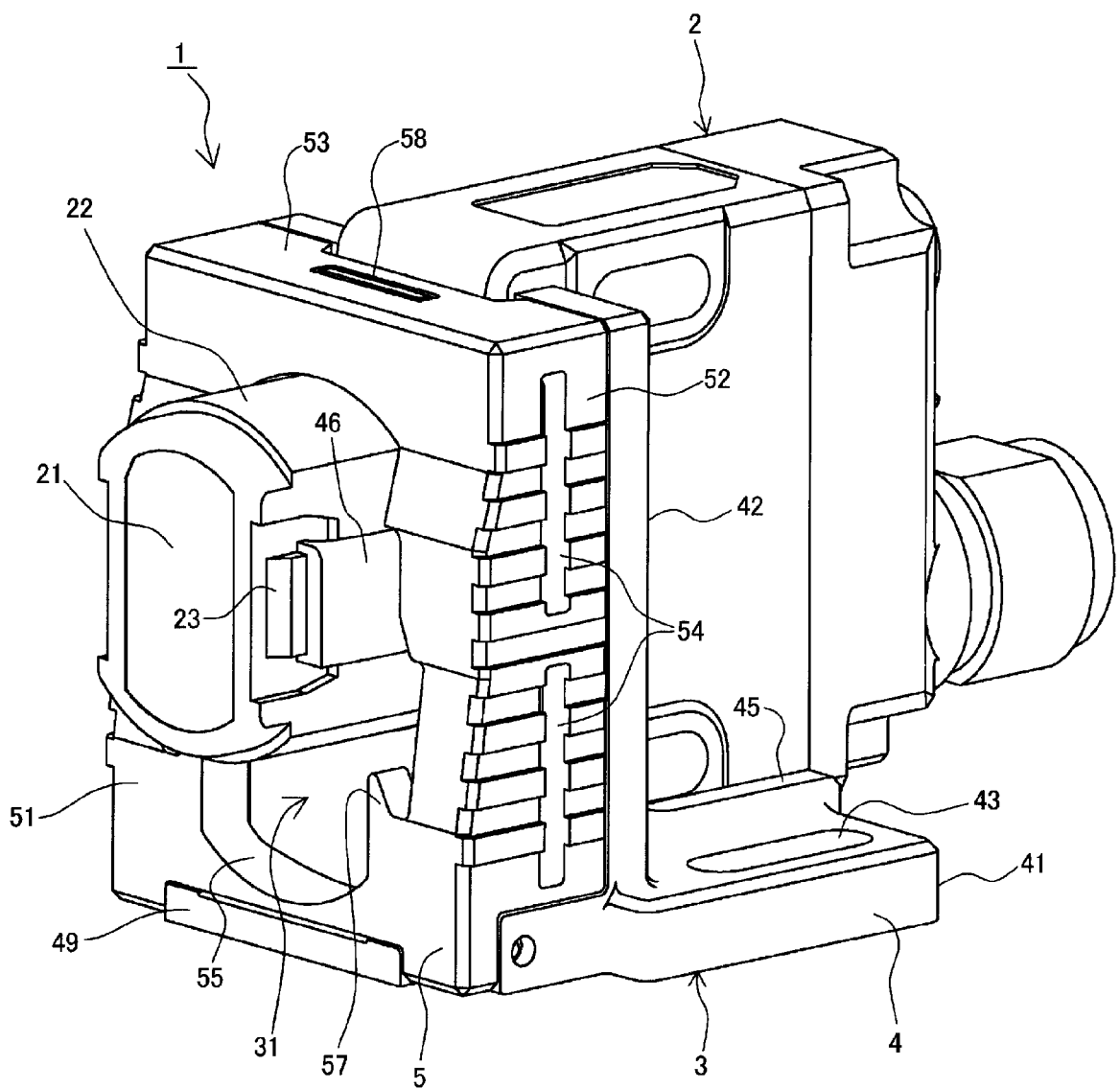
FIG. 1 is a front perspective view illustrating one example of a photo-electrical sensor according to an embodiment of the present invention.
Figure 2:
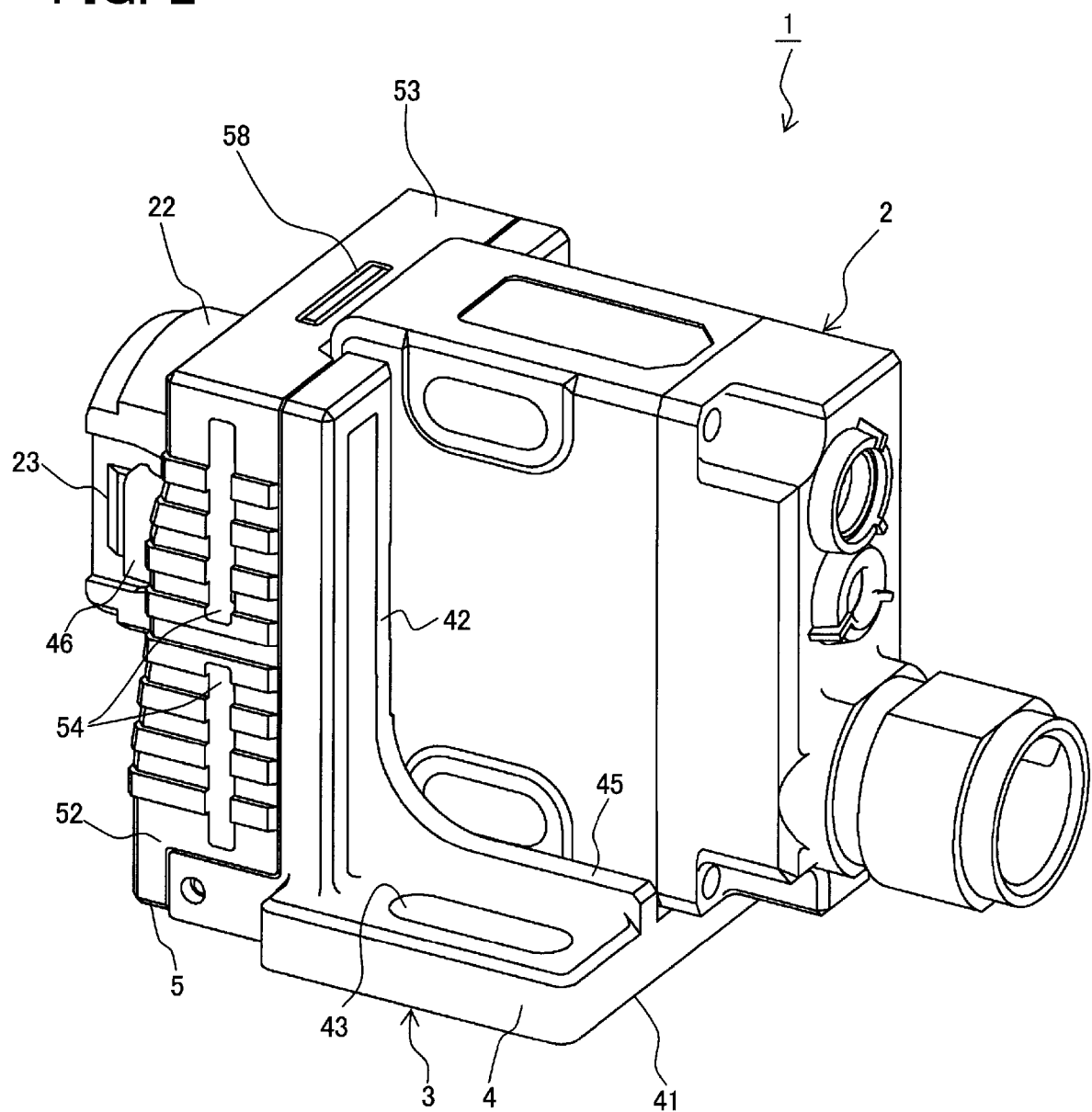
FIG. 2 is a rear perspective view illustrating the photo-electrical sensor of FIG. 1.
Figure 3:
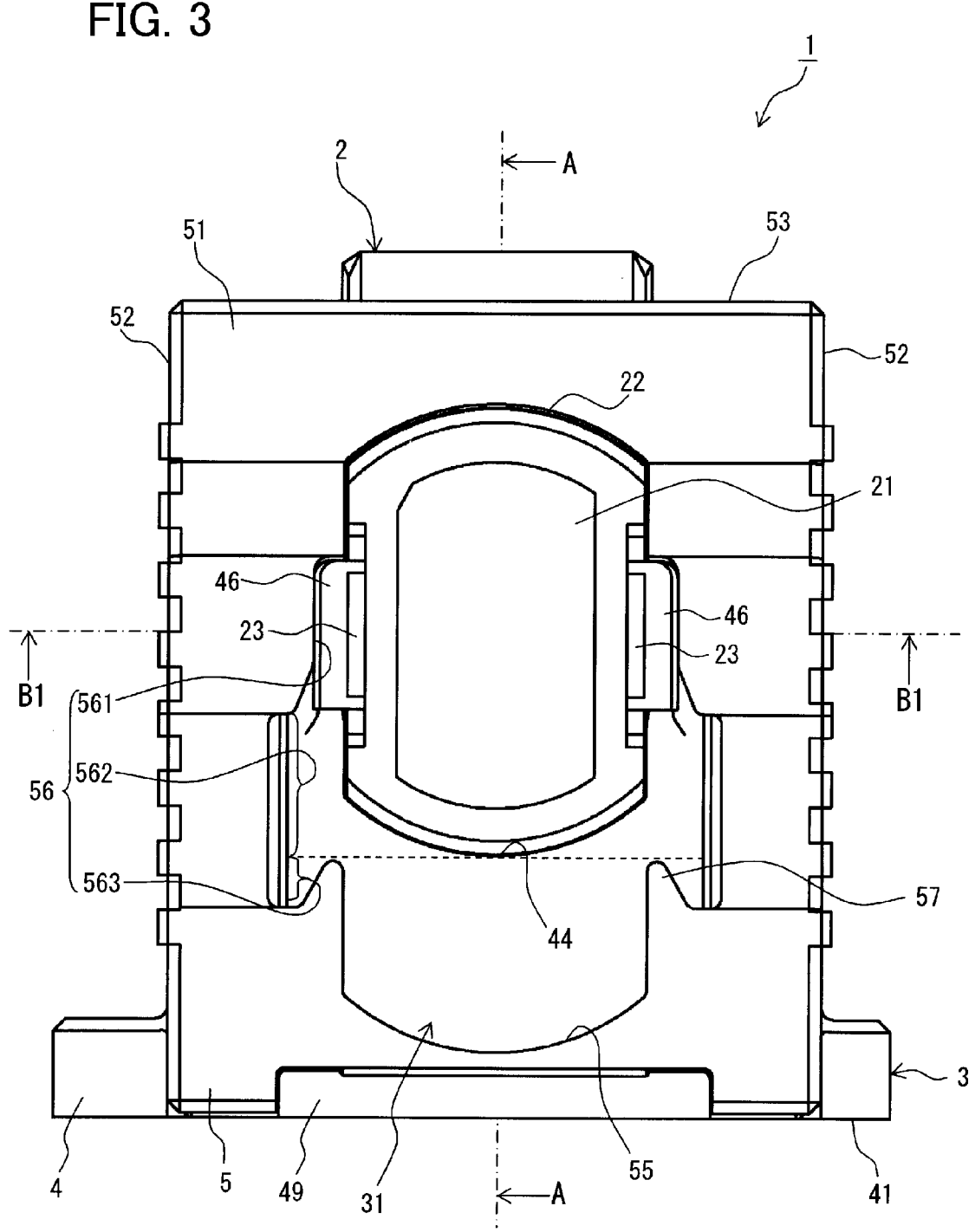
FIG. 3 is a front elevational view illustrating the photo-electrical sensor of FIG. 1.
Figure 4:
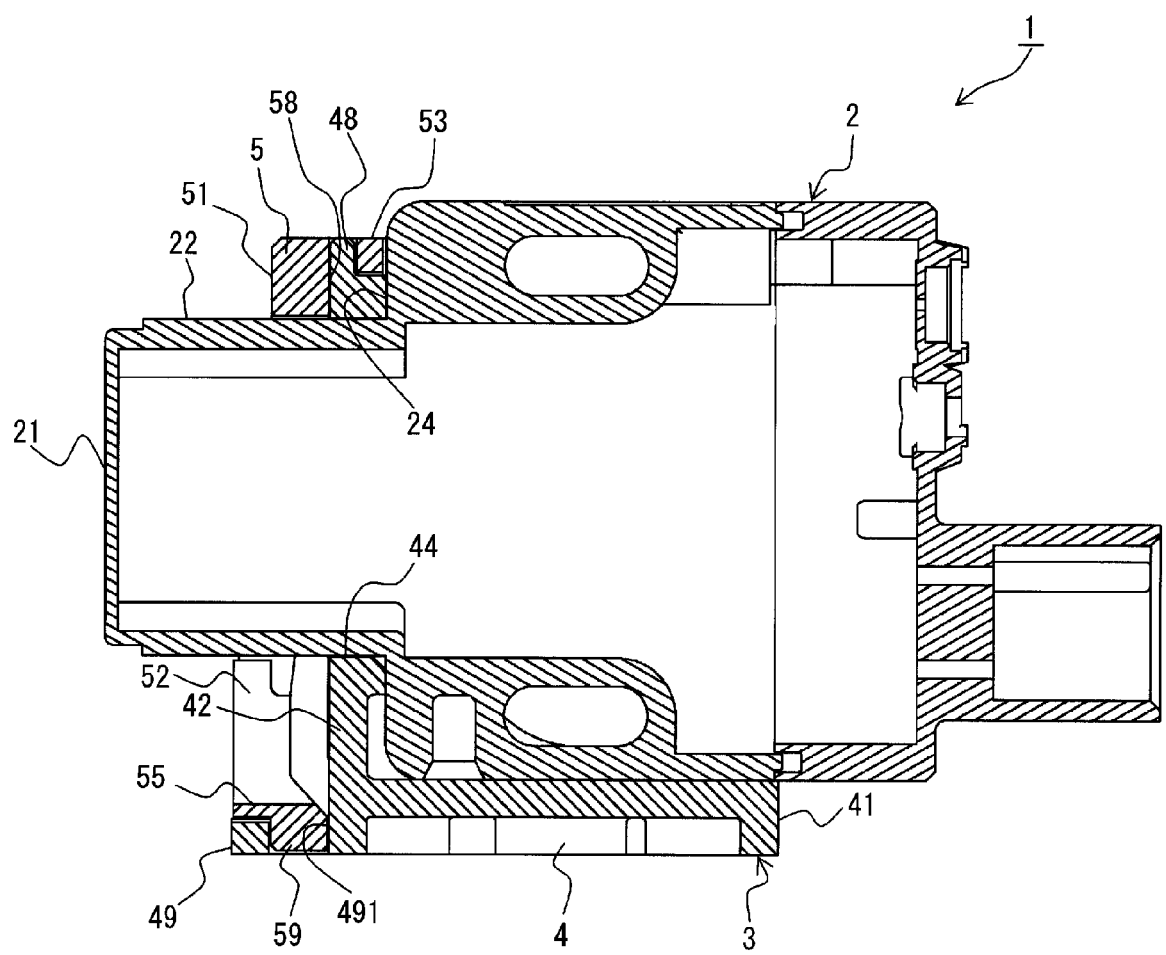
FIG. 4 is a cross-sectional view taken along a line A-A shown in FIG. 3.
Figure 5:
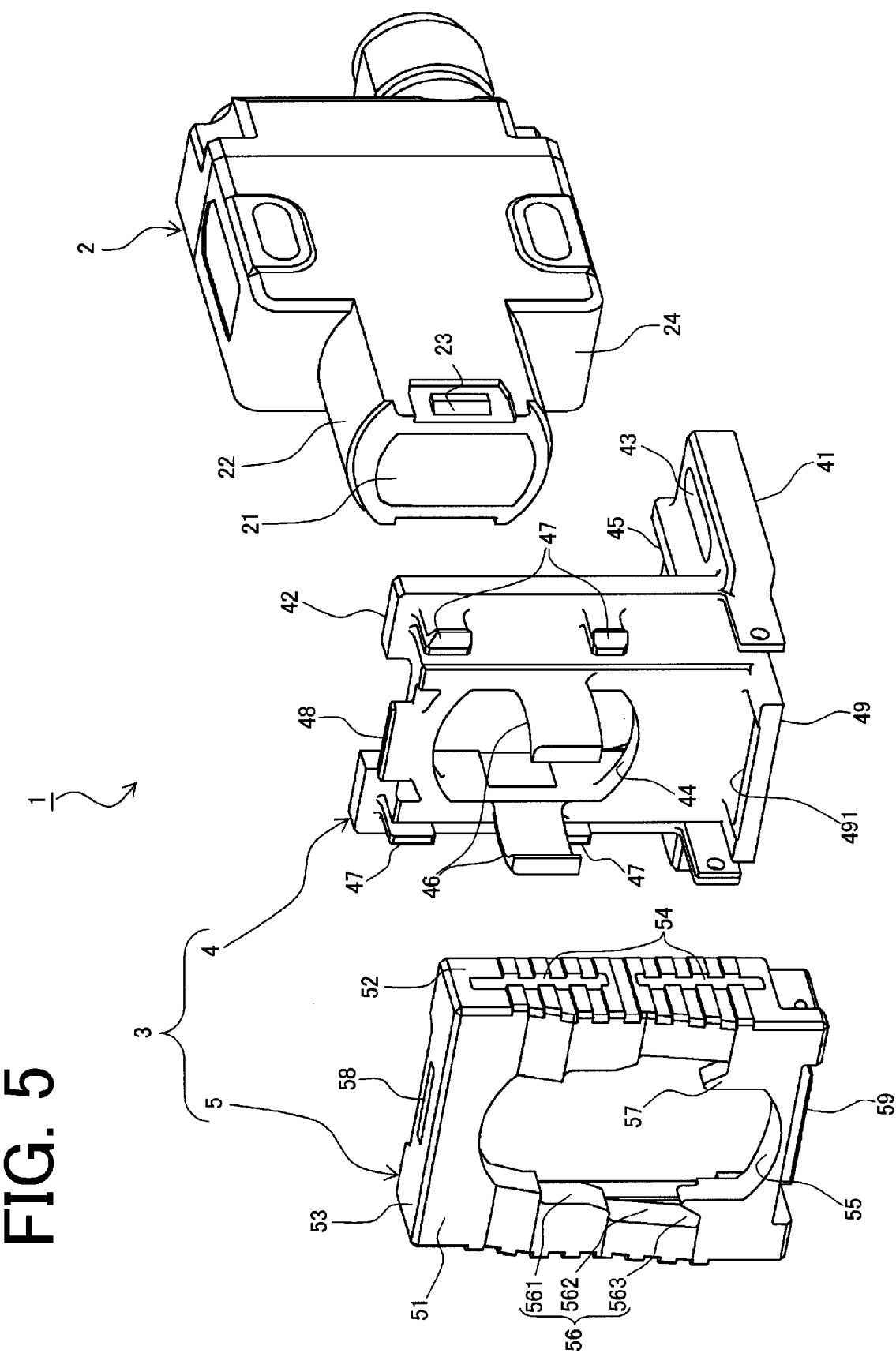
FIG. 5 is a front exploded perspective view illustrating the photo-electrical sensor of FIG. 1.
Figure 6:
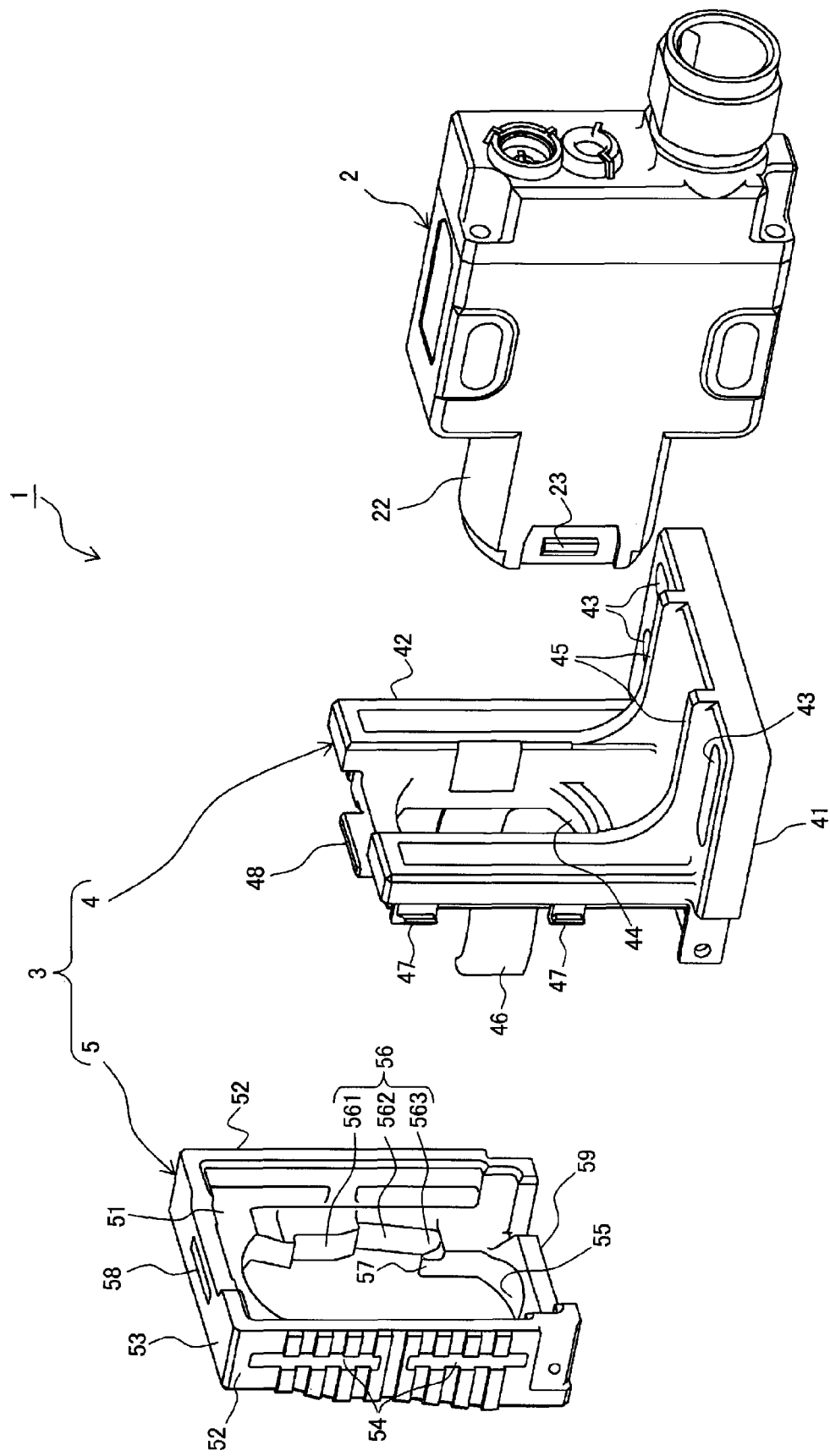
FIG. 6 is a rear exploded perspective view illustrating the photo-electrical sensor of FIG. 1.
Figure 7A:
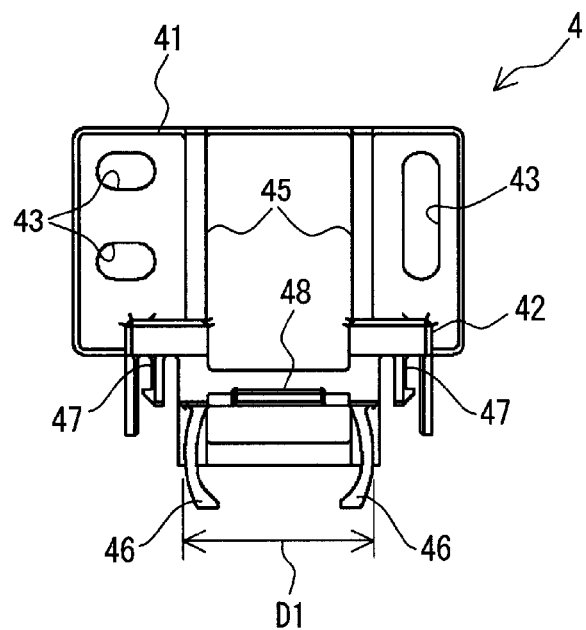
FIGS. 7A to 7C illustrate a configuration of a holding member, respectively showing a plan view, a front elevational view, and a side elevational view of the holding member.
Figure 7B:
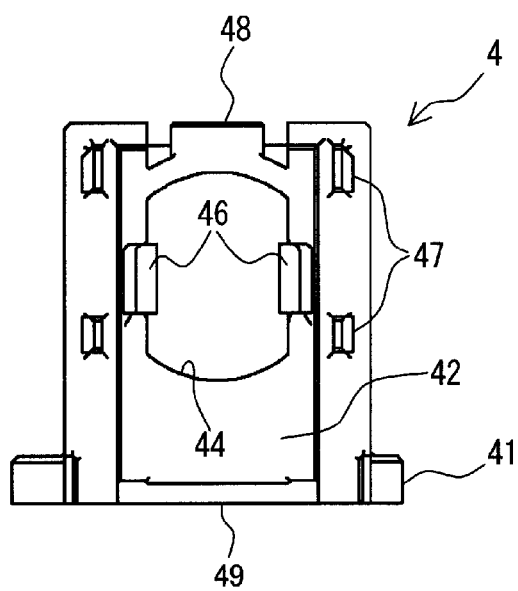
Figure 7C:
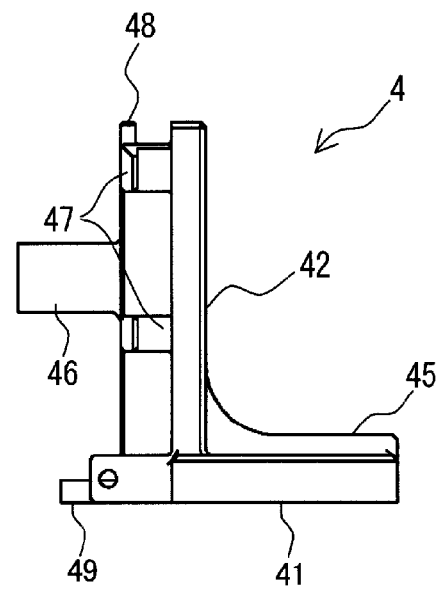
Figure 8A:
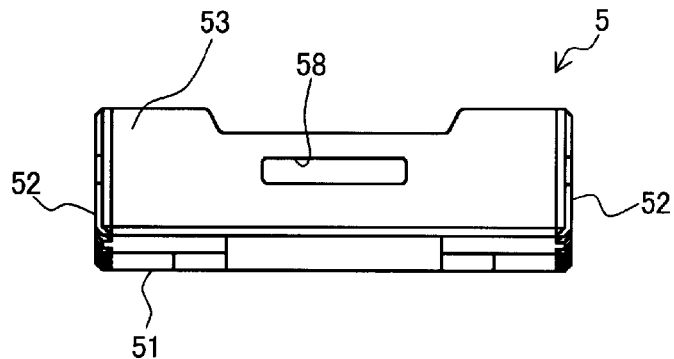
FIGS. 8A to 8D illustrate a configuration of an operation member, respectively showing a plan view, a front elevational view, and a side elevational view, and a bottom plan view of the operation member.
Figure 8B:
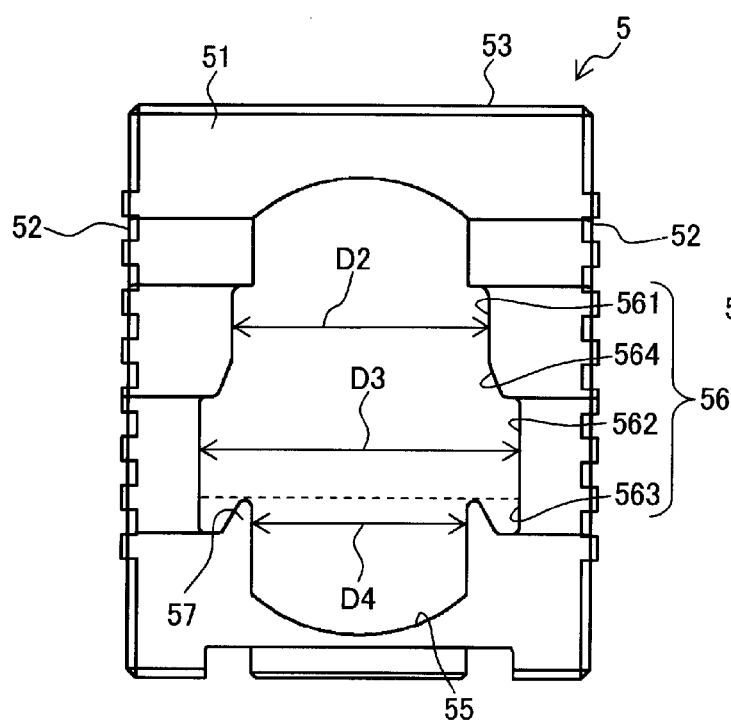
Figure 8C:
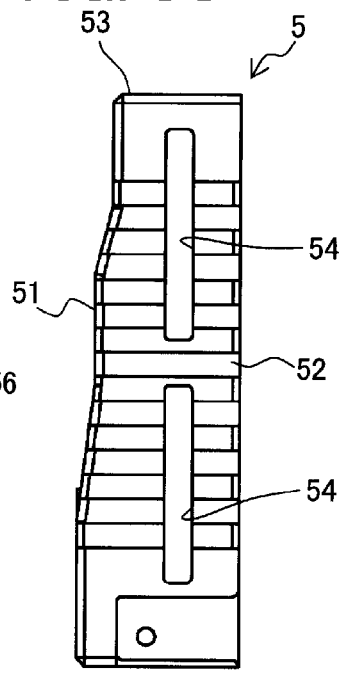
Figure 8D:
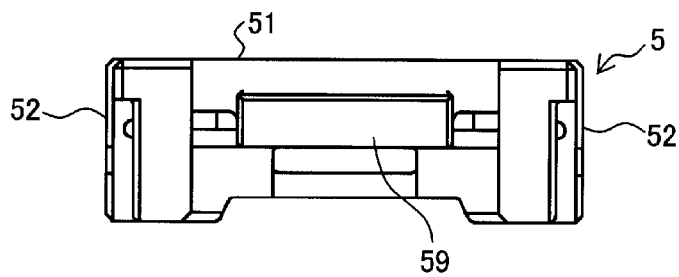

FIG. 1 is a front perspective view illustrating one example of a photo-electrical sensor 1 according to an embodiment of the present invention. FIG. 2 is a rear perspective view illustrating the photo-electrical sensor 1 of FIG. 1. FIG. 3 is a front elevational view illustrating the photo-electrical sensor 1 of FIG. 1. FIG. 4 is a cross-sectional view taken along a line A-A shown in FIG. 3. FIG. 5 is a front exploded perspective view illustrating the photo-electrical sensor 1 of FIG. 1. FIG. 6 is a rear exploded perspective view the photo-electrical sensor 1 of FIG. 1. FIGS. 7A to 7C illustrate a configuration of a holding member 4, respectively showing a plan view, a front elevational view, and a side elevational view of the holding member 4. FIGS. 8A to 8D illustrate a configuration of an operation member 5, respectively showing a plan view, a front elevational view, and a side elevational view, and a bottom plan view of the operation member 5. The following describes the present invention taking a left side and right side in FIG. 4 respectively as a front side and a rear side.

The photo-electrical sensor 1 is provided with a sensor main body 2 and a sensor attachment device 3 to which the sensor main body 2 is attached. The sensor main body 2 accommodates an optical element such as a photo-electrical element and a light emitting element, and a translucent surface 21 that irradiates and receives light is formed on a front surface of the sensor main body 2. The sensor attachment device 3 is previously fixed at an installation position of the photo-electrical sensor 1, and the sensor main body 2 is attached to the sensor attachment device 3 by insertion of a front end portion of the sensor main body 2 into an opening 31 that opens in the sensor attachment device 3 from a rear side of the sensor main body 2. The front end portion of the sensor main body 2 forms an insertion portion 22 that is inserted into the opening 31, and the translucent surface 21 is formed on a front end surface of the insertion portion 22.

The sensor attachment device 3 is provided with the holding member 4 that is fixed to the installation position of the photo-electrical sensor 1 and the operation member 5 that is displaceably attached to the holding member 4. The holding member 4 is an almost L-shaped member that is formed integrally by a plate-shaped fixation portion 41 that is brought in contact with and fixed to the installation position of the photo-electrical sensor 1 and a plate-shaped attachment portion 42 that protrudes substantially vertically upward from a front end portion of the fixation portion 41 and to which the sensor main body 2 is detachably attached.

A fixture for fixing the holding member 4 at the installation position, for example, a fixation opening 43 for inserting a screw or the like is formed on each of left and side ends of the fixation portion 41 of the holding member 4. On the other hand, an insertion opening 44 that constitutes the opening 31 and into which the insertion portion 22 of the sensor main body 2 is inserted is formed on the attachment portion 42 of the holding member 4. The insertion opening 44 is formed into a shape that corresponds to the insertion portion 22 of the sensor main body 2, and is capable of hold the sensor main body 2 with the insertion portion 22 inserted into the insertion opening 44.

A pair of ribs 45 that continues in an almost L-shape is formed on an upper surface of the fixation portion 41 and a rear surface of the attachment portion 42 of the holding member 4. The pair of ribs 45 face toward each other with a certain distance therebetween in a right-left direction, which distance corresponds to a width of the sensor main body 2 in the right-left direction. Accordingly, when inserting the insertion portion 22 of the sensor main body 2 into the insertion opening 44 of the holding member 4 from the rear side, the pair of ribs 45 serves as a guide that is slidably in contact with both left and right sides of the sensor main body 2, thereby favorable insertion of the insertion portion 22 into the insertion opening 44 can be established, as well as displacement of the sensor main body 2 after the insertion toward the left or right direction can be prevented.

A pair of locking hooks 46 is formed respectively on left and right sides of the insertion opening 44 on the front side of the attachment portion 42 of the holding member 4. The locking hooks 46 extend in a forward direction along which the sensor main body 2 is inserted, and is curved in an arched shape protruding externally so that central portions of the pair of locking hooks 46 face away from each other. In other words, the central portion of one locking hook 46 on the left side protrudes leftward, and the central portion of one locking hook 46 on the right side protrudes rightward.

Each of tip ends of the pair of locking hooks 46 is provided at a corresponding position of both left and right sides of the insertion portion 22 of the sensor main body 2 that is inserted into the insertion opening 44. When the insertion portion 22 is inserted into the insertion opening 44, each tip end of the pair of locking hooks 46 is brought into contact with the corresponding left or right side of the insertion portion 22, and locked to a locking projection 23 that is formed on the corresponding left or right side of the insertion portion 22. In other words, when the insertion portion 22 of the sensor main body 2 is inserted into the insertion opening 44 from the rear side, the locking projection 23 formed on the insertion portion 22 is brought into contact with the tip end of the corresponding locking hook 46 from the rear side, and when the insertion portion 22 is further inserted, elastic deformation of each locking hook 46 causes the tip end of each locking hook 46 crosses over the corresponding locking projection 23.

In this state, a contacting surface 24 of the sensor main body 2 from where the insertion portion 22 protrudes faces towards the rear side of the attachment portion 42 of the holding member 4 to prevent the sensor main body 2 from moving forward. At the same time, each of the locking projections 23 faces towards a front side of the corresponding tip end of the locking hook 46 to prevent the sensor main body 2 from moving backward, thereby providing a temporary joint for the sensor main body 2.

The operation member 5 is configured by integrally forming a rectangular front plate 51, side plates 52 that respectively protrude backward from both left and right ends of the front plate 51, and a top plate 53 that protrudes backward from top end portion of the front plate 51. Each of the side plates 52 of the operation member 5 has a pair of long holes 54 that extend in a vertical direction and are aligned in a vertical straight line.

A pair of sliding hooks 47 projecting forward for slidably attaching the operation member 5 are vertically provided at each of left and right end portions on a front surface of the attachment portion 42 of the holding member 4. The sliding hooks 47 are engaged from inside with the respective long holes 54 formed on the left and right side plates 52 of the operation member 5. Each sliding hook 47 is vertically slidable within the corresponding long hole 54. With this configuration, the operation member 5 can be attached vertically slidably with respect to the attachment portion 42 of the holding member 4.

The front plate 51 of the operation member 5 has a through hole 55 through which the insertion portion 22 of the sensor main body 2 that is inserted into the insertion opening 44 of the holding member 4 penetrates. The through hole 55 is an opening larger than the insertion opening 44, and faces toward the insertion opening 44 as a whole when the operation member 5 is attached to the holding member 4. Further, when the operation member 5 is attached to the holding member 4, the pair of locking hooks 46 provided for the holding member 4 penetrate through the through hole 55 of the operation member 5, and the tip end of each locking hook 46 is positioned on the front side from the front plate 51 of the operation member 5.

An inner surface of the through hole 55 provided for the operation member 5 forms a pair of facing surfaces 56 respectively on left and right end portions of the through hole 55. The pair of facing surfaces 56 respectively face toward external surfaces of the pair of locking hooks 46 at central portions, i.e., a right side surface of the right locking hook 46 and a left side surface of the left locking hook 46. A first region 561, a second region 562, and a third region 563 are provided on each facing surface 56 in the stated order from top to bottom. Accordingly, by having the operation member 5 slide vertically with respect to the attachment portion 42 of the holding member 4, any of the first to third regions 561-563 of each facing surface 56 can face toward the external surface of the locking hook 46.

The first regions 561 facing each other respectively of the pair of facing surfaces 56 are parallel flat surfaces that extend vertically, and a distance D2 between the first regions 561 is smaller than a distance D1 between the external surfaces of the central portions of the locking hooks 46 when external force is not applied thereon. On the other hand, the second regions 562 facing each other respectively of the pair of facing surfaces 56 are parallel flat surfaces that extend vertically, and a distance D3 between the second regions 562 is larger than the distance D1 between the external surfaces of the central portions of the locking hooks 46 when external force is not applied thereon.

Here, the distance D2 between the first regions 561 defines a suppress strength when the operation member 5 presses the locking hooks 46 against the sensor main body 2 in a state in which the facing surfaces 56 face toward the external surfaces of the central portions of the locking hooks 46 at the first regions 561. Thus, the distance D2 is set based on a value set as the suppress strength to be a smaller value than a predetermined value, for example, the distance D1.

On the other hand, the distance D3 only needs to be larger than the distance D2 between the first regions 561, because the distance D3 between the second regions 562 only needs to provide a temporary joint by locking the locking hooks 46 to the sensor main body 2 at the second regions 562 with the facing surfaces 56 facing toward the external surfaces of the central portions of the locking hooks 46. Accordingly, the distance D3 may be smaller than the distance D1 between the external surfaces of the central portions of the locking hooks 46 when the external force is not applied thereon. The distance D3 can be such that the operation member 5 slightly presses the central portions of the locking hooks 46 when the facing surfaces 56 face toward the external surfaces of the central portions of the locking hooks 46 at the second regions 562.

The first region 561 and the second region 562 of each facing surface 56 are connected via a fourth region 564 that is a smooth sloped surface.

The third regions 563 facing each other respectively of the pair of facing surfaces 56 are parallel flat surfaces that extend vertically, and in this example, the distance between the facing third regions 563 is equal to the distance D3 between the second regions 562. In other words, the second region 562 and the third region 563 of each facing surface 56 are formed by flat surfaces that linearly extend in the vertical direction. However, the present invention is not limited to such a configuration, and can be configured such that the distance between the third regions 563 facing each other is different from the distance D3 between the second regions 562, for example, larger than the distance D3 between the second regions 562.

A pair of pressing portions 57 which projects upward from bottom is provided between the third regions 563 facing each other. The pressing portions 57 are parallel flat surfaces whose inner surfaces that face each other extend vertically. A distance D4 between the inner surfaces corresponds to a distance between the left and right side surfaces of the insertion portion 22 of the sensor main body 2. On the other hand, an external surface of each pressing portion 57 is formed in a wedge shape having a sloped surface and each pressing portion 57 is tapered toward an upper side. A top end of each third region 563 of the pair of facing surfaces 56 face toward a tip end of each pressing portion 57, and the pressing portions 57 are not positioned between the second regions 562 that are above the respective third regions 563. As described later, the pressing portions 57 are provided in order to press the respective locking hooks 46 outwardly.

A long hole 58 extending in the right-left direction is provided in the top plate 53 of the operation member 5. In addition, a projection 59 extending in the right-left direction is formed to project downward at a bottom end of the front plate 51 of the operation member 5. On the other hand, a projection 48 having a shape corresponding to the shape of the long hole 58 of the operation member 5 is formed to project upward at a top end portion of the attachment portion 42 of the holding member 4. A bottom plate 49 protruding frontward is formed at a bottom end of the attachment portion 42 of the holding member 4, and a long hole 491 having a shape corresponding to the shape of the projection 59 of the operation member 5 is formed in the bottom plate 49.

FIGS. 1 to 4 show the example in which the external surfaces of the central portions of the pair of locking hooks 46 respectively face the first regions 561 of the facing surfaces 56. In this state, the locking hooks 46 are elastically deformed to extend straight, in comparison with the locking hooks 46 when no external force is applied, by pressing the central portions of the pair of locking hooks 46 inwardly by the respective first regions 561 of the facing surfaces 56. As a result, the locking projection 23 of the sensor main body 2 is urged forward by the tip ends of the locking hooks 46, and a backward reactive force is applied on the contacting surface 24 of the sensor main body 2 from the attachment portion 42 of the holding member 4. This suppresses jouncing of the sensor main body 2 in an anteroposterior direction, and the sensor main body 2 is fixed to the holding member 4.

An upper inner surface of the through hole 55 has a shape corresponding to an upper external surface of the insertion portion 22 of the sensor main body 2. In the example shown in FIGS. 1 to 4, the entire upper external surface of the insertion portion 22 of the sensor main body 2 face toward the upper inner surface of the through hole 55. Further, in the example shown in FIGS. 1 to 4, by inserting the projection 48 of the holding member 4 into the long hole 58 of the operation member 5, and by inserting the projection 59 of the operation member 5 into the long hole 491 of the holding member 4, jouncing of the operation member 5 with respect to the holding member 4 is suppressed. For this reason, when an external force is applied on the sensor attachment device 3 due to a cable of the sensor main body 2 being pulled, for example, it is possible to prevent the sensor attachment device 3 from being flexed or twisted.

Figure 9:
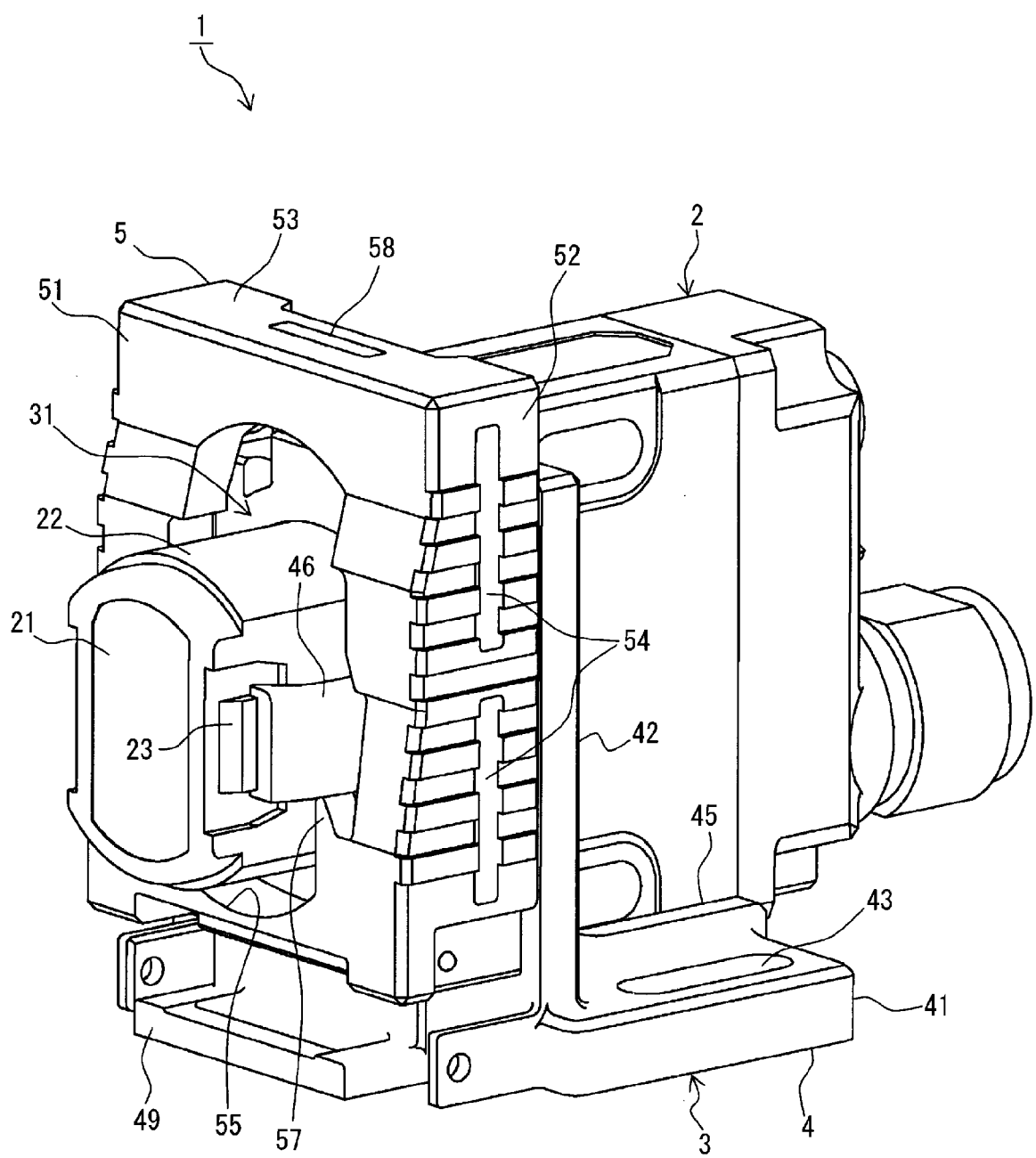
FIG. 9 is a perspective view of the photo-electrical sensor of FIG. 1, illustrating how a second region of each facing surface of the operation member faces toward an external surface of a locking hook at a corresponding position.
Figure 10:
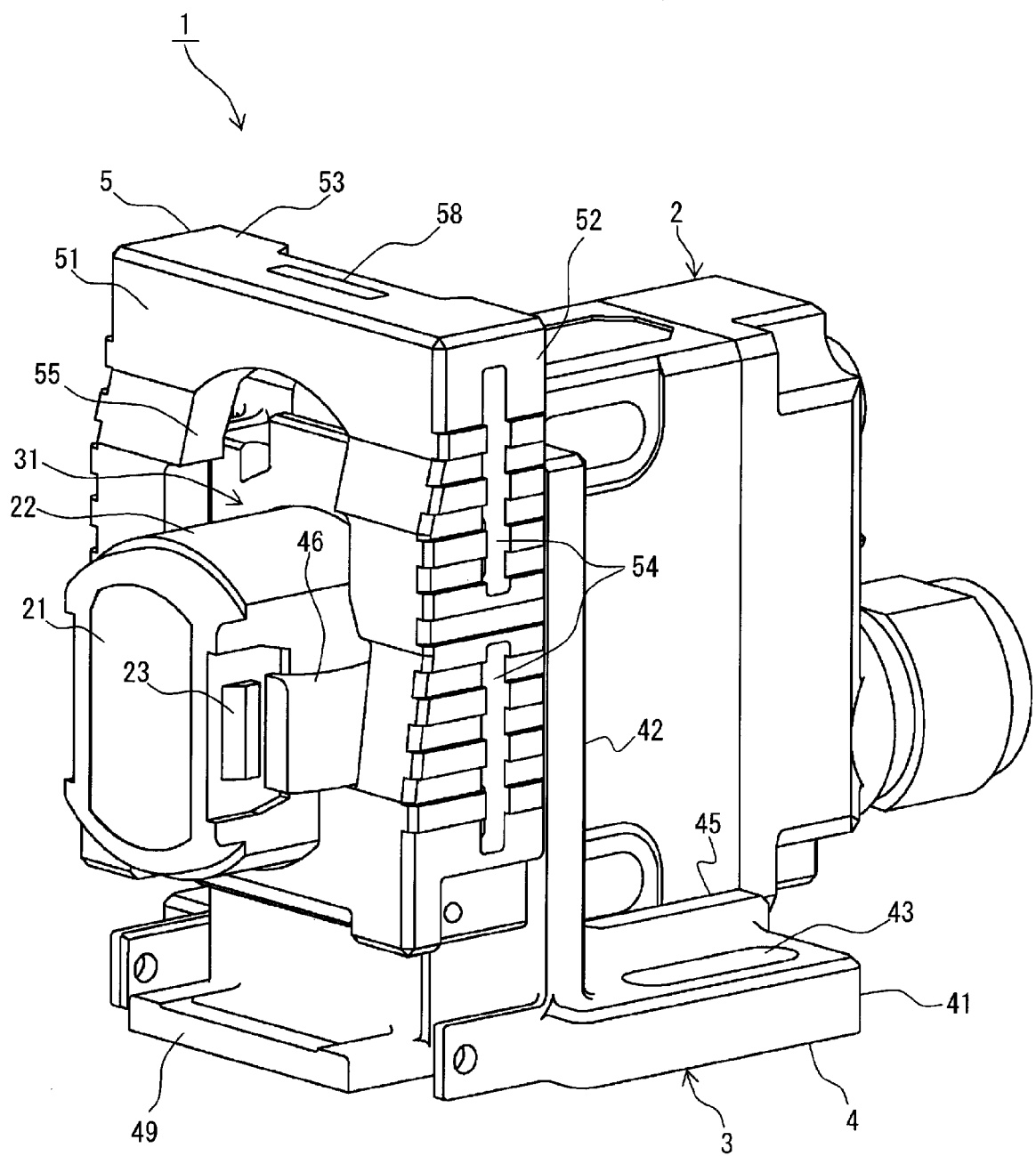
FIG. 10 is a perspective view of the photo-electrical sensor of FIG. 1, illustrating how a third region of each facing surface of the operation member faces toward the external surface of the locking hook at a corresponding position.
Figure 11:
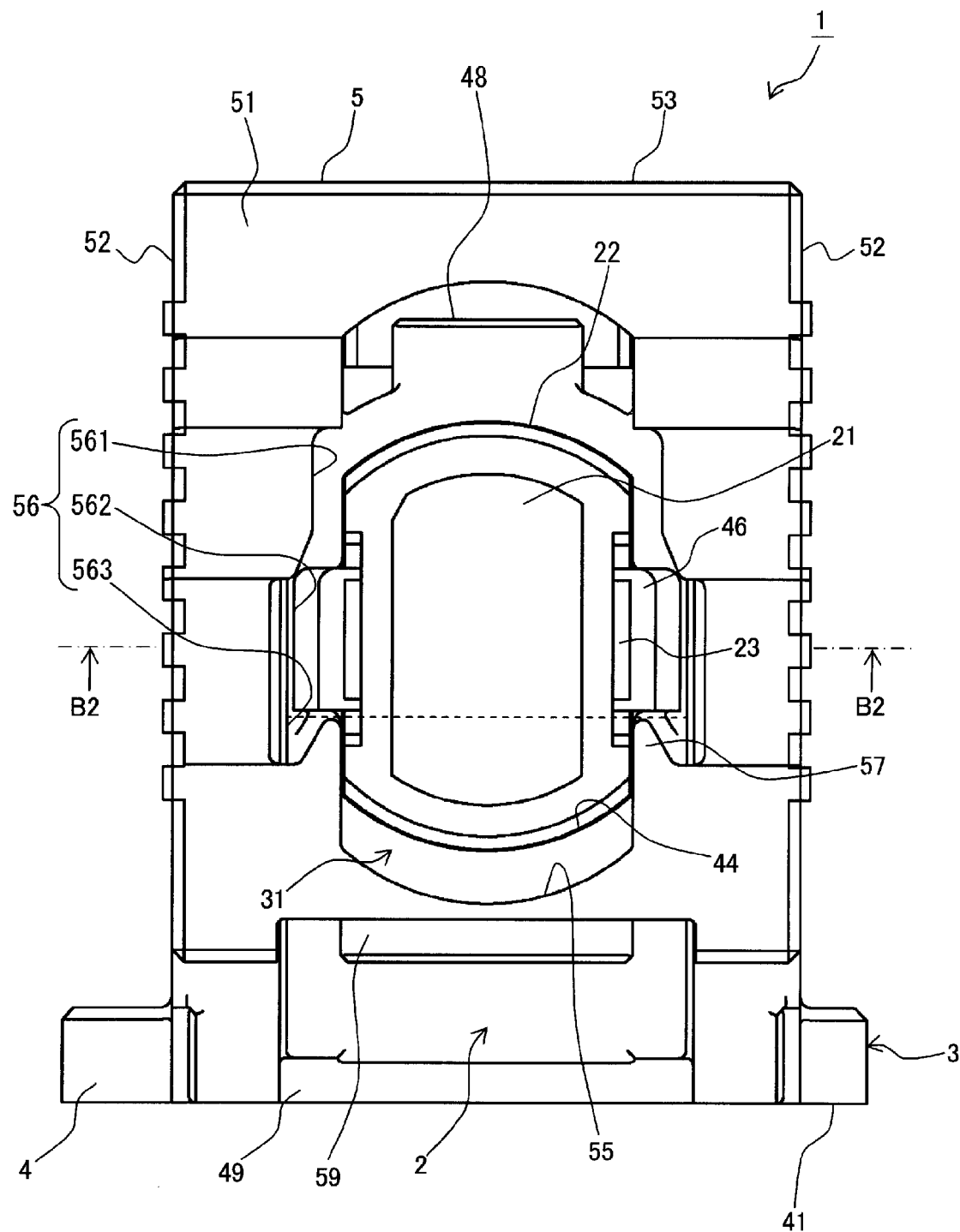
FIG. 11 is a front elevational view of the photo-electrical sensor of FIG. 1, illustrating how the second region of each facing surface of the operation member faces toward the external surface of the locking hook at the corresponding position.
Figure 12:
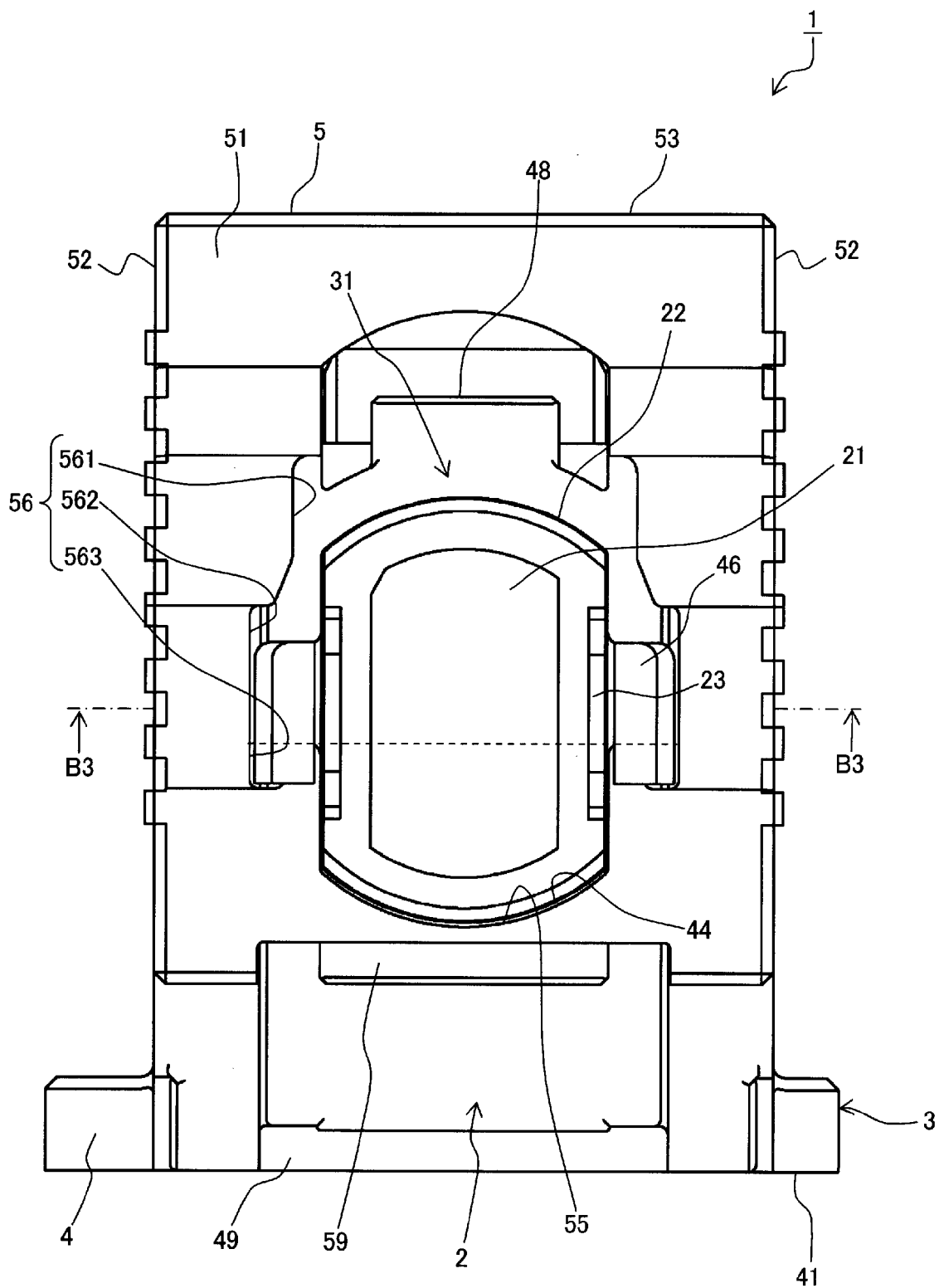
FIG. 12 is a front elevational view of the photo-electrical sensor of FIG. 1, illustrating how the third region of each facing surface of the operation member faces toward the external surface of the locking hook at the corresponding position.
Figure 13:
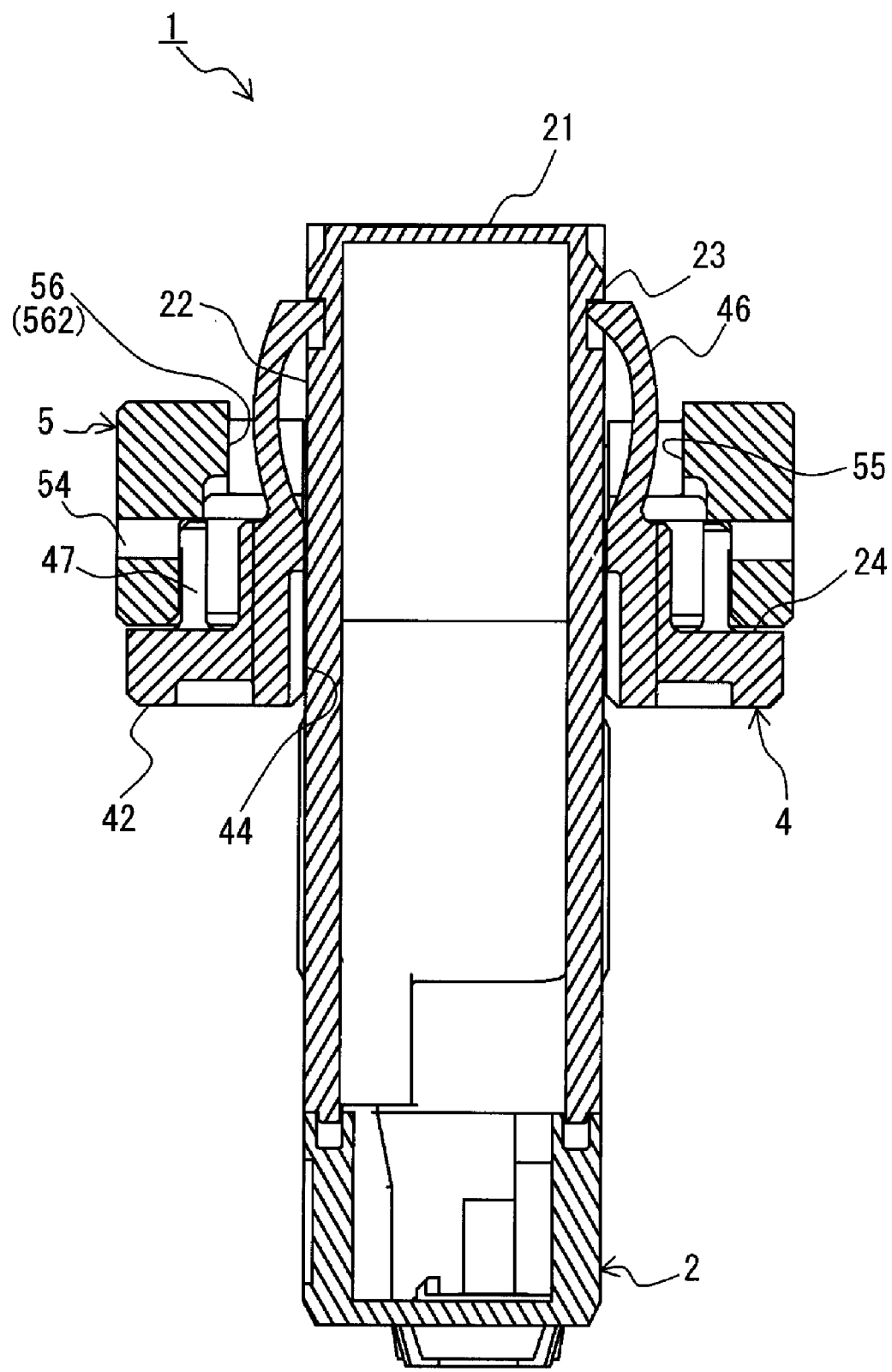
FIG. 13 is a cross-sectional view of the photo-electrical sensor of FIG. 1, taken along a line B2-B2 shown in FIG. 11.
Figure 14:
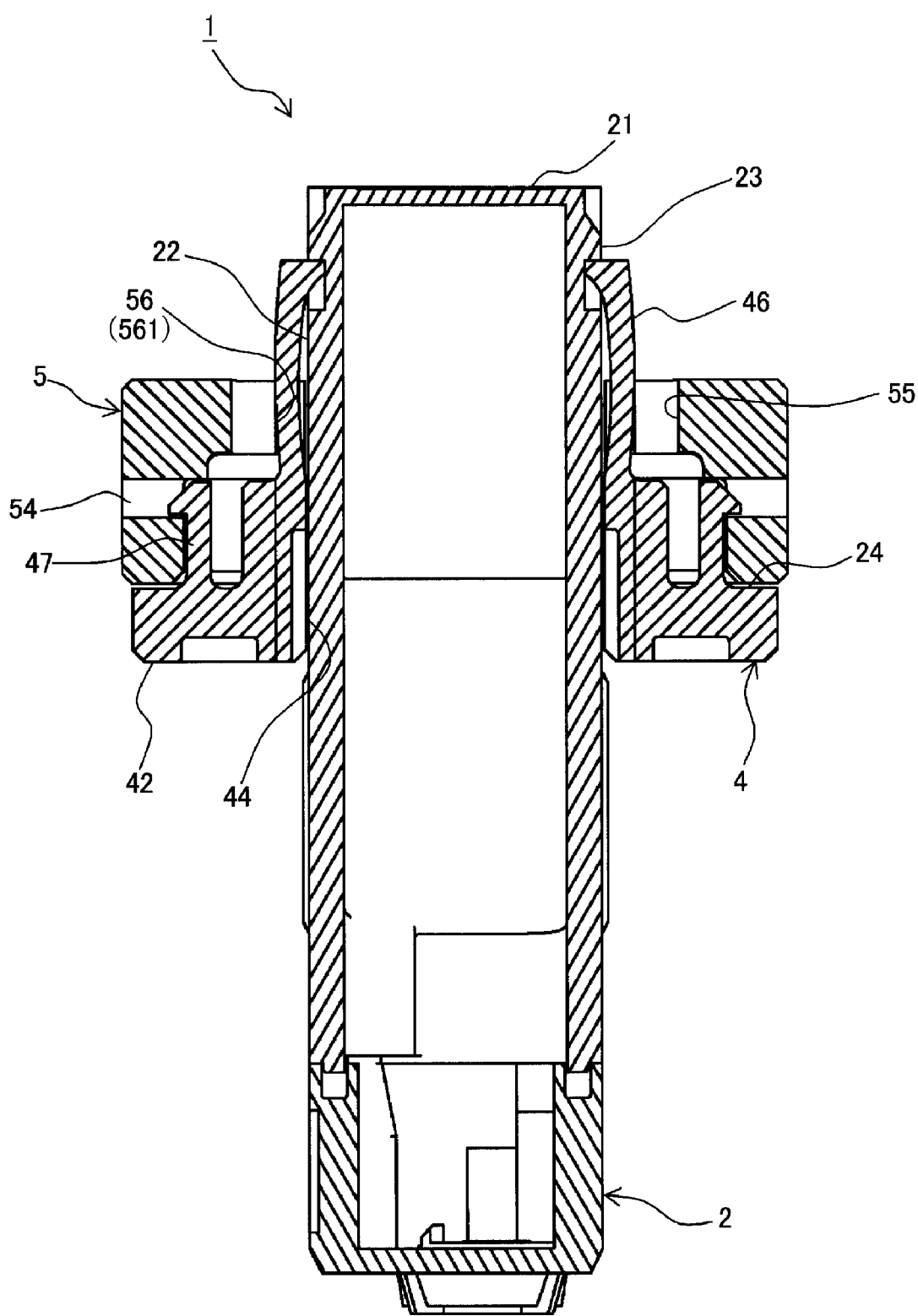
FIG. 14 is a cross-sectional view of the photo-electrical sensor of FIG. 1, taken along a line B1-B1 shown in FIG. 3.
Figure 15:
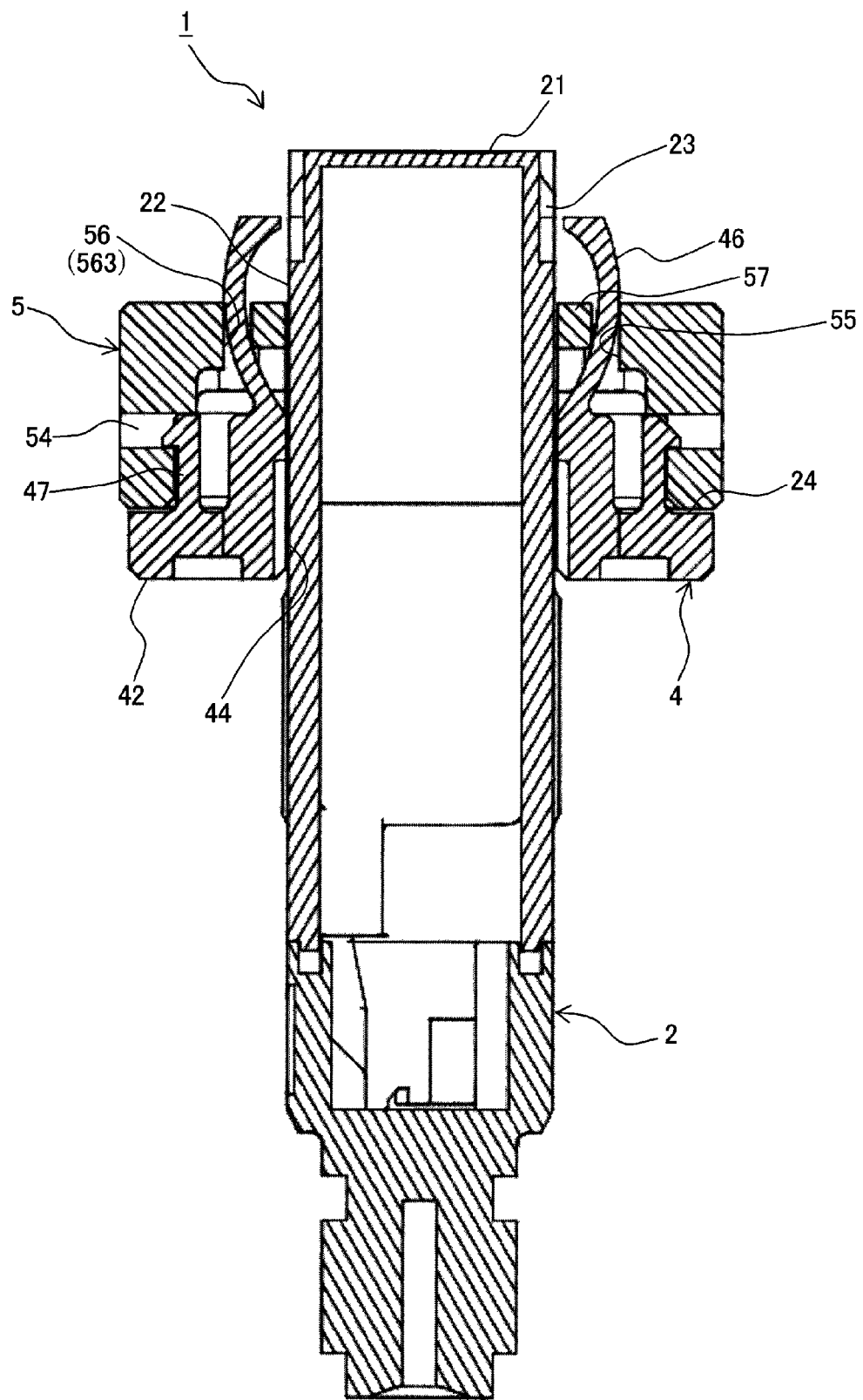
FIG. 15 is a cross-sectional view of the photo-electrical sensor of FIG. 1, taken along a line B3-B3 shown in FIG. 12.
Figure 16:
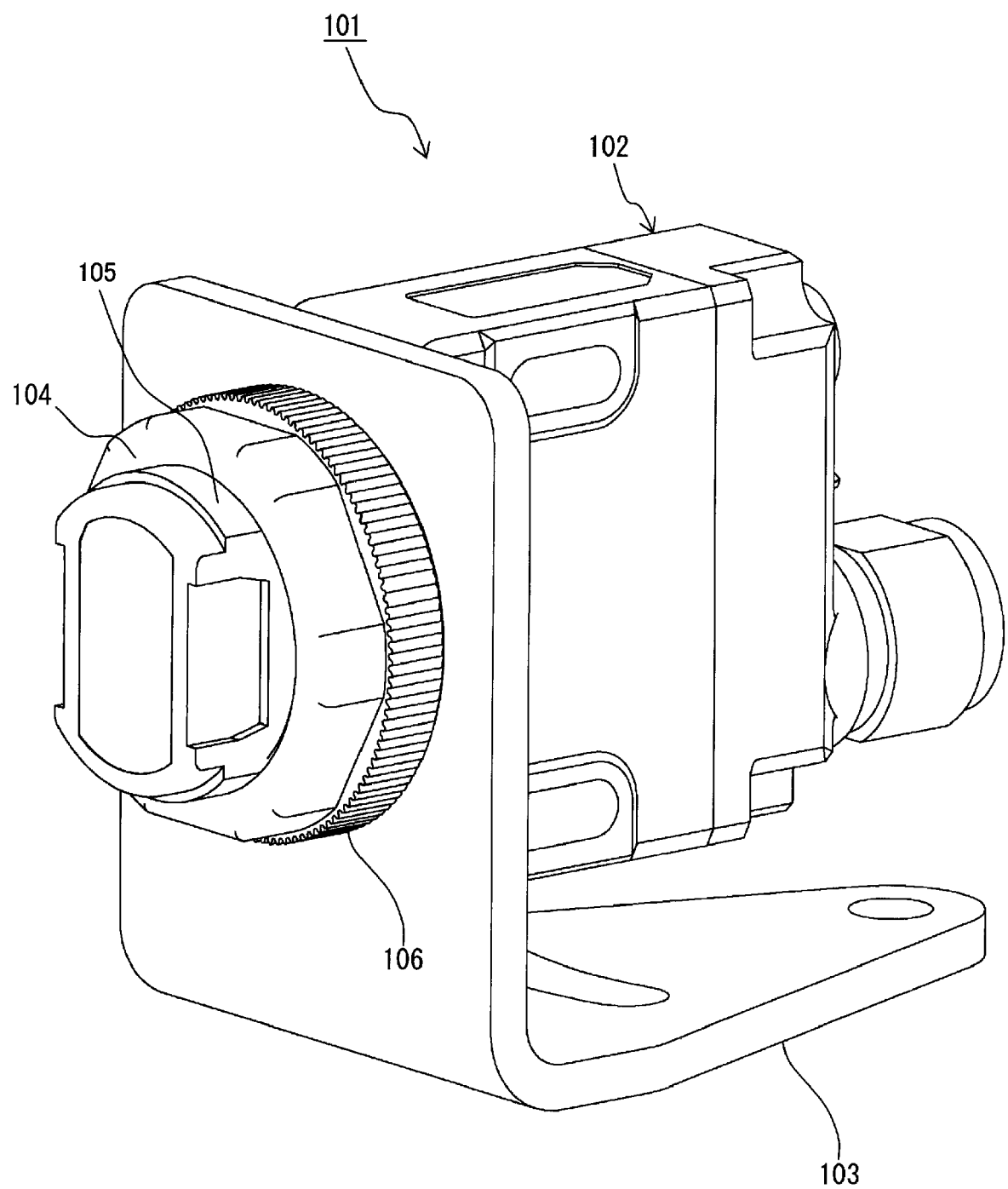
FIG. 16 is a perspective view of one example of an attachment arrangement of a sensor main body in a conventional sensor.

FIGS. 9 and 10 are perspective views of the photo-electrical sensor 1 of FIG. 1. FIG. 9 illustrates how the second region 562 of each facing surface 56 of the operation member 5 faces toward the external surface of the locking hook 46 at a corresponding position, and FIG. 10 illustrates how the third region 563 of each facing surface 56 of the operation member 5 faces toward the external surface of the locking hook 46 at a corresponding position. FIGS. 11 and 12 are front elevational views of the photo-electrical sensor 1 of FIG. 1. FIG. 11 illustrates how the second region 562 of each facing surface 56 of the operation member 5 faces toward the external surface of the locking hook 46 at the corresponding position, and FIG. 12 illustrates how the third region 563 of each facing surface 56 of the operation member 5 faces toward the external surface of the locking hook 46 at the corresponding position. FIGS. 13, 14, and 15 are cross-sectional views of the photo-electrical sensor 1 of FIG. 1, respectively taken along a line B2-B2 shown in FIG. 11, taken along a line B1-B1 shown in FIG. 3, and taken along a line B3-B3 shown in FIG. 12.

When attaching the sensor main body 2 to the sensor attachment device 3, the operation member 5 of the sensor attachment device 3 is first brought into the state as shown in FIGS. 9, 11, and 13. In this state, the external surfaces of the central portions of the pair of locking hooks 46 face toward the respective second regions 562 of the facing surfaces 56, and the second region 562 and the external surface of the locking hook 46 are spaced. This allows elastic deformation of each locking hook 46 in an outward direction. In this state, when the insertion portion 22 of the sensor main body 2 from the rear side is inserted into the opening 31 of the sensor attachment device 3, the insertion portion 22 penetrates through the insertion opening 44 of the holding member 4 and the through hole 55 of the operation member 5, thereby bringing the locking projection 23 formed on each of the left and right sides of the insertion portion 22 into contact with the corresponding tip end of each locking hook 46.

Then, the locking hooks 46 are elastically deformed by inserting the insertion portion 22 of the sensor main body 2 further forward to have the locking projections 23 cross over the respective tip ends of the locking hook 46, thereby the tip ends are locked as shown in FIGS. 9, 11, and 13. After the temporary joint of the sensor main body 2 is provided in this manner, the locking hooks 46 are gradually pressed inward along the respective fourth regions 564 of the facing surfaces 56 by having the operation member 5 slide downward. Thus, the sensor main body 2 can be attached to the holding member 4 as described above, with the first regions 561 of the facing surfaces 56 facing the external surfaces of the locking hooks 46.

In other words, as shown in FIG. 14, the pair of locking hooks 46 are elastically deformed to extend straight, in comparison with the locking hooks 46 when no external force is applied, by the suppress strength from the first regions 561 of the facing surfaces 56. As a result, the sensor main body 2 is attached with the locking projection 23 of the sensor main body 2 being urged forward by the tip ends of the locking hooks 46.

On the other hand, when detaching the sensor main body 2 from the sensor attachment device 3, the external surfaces of the central portions of the pair of locking hooks 46 face toward the third regions 563 of the respective facing surfaces 56, as shown in FIGS. 10, 12, and 15, by having the operation member 5 of the sensor attachment device 3 slide upward. A lower inner surface of the through hole 55 has a shape corresponding to a lower external surface of the insertion portion 22 of the sensor main body 2. In the example shown in FIGS. 10, 12, and 15, the entire lower external surface of the insertion portion 22 of the sensor main body 2 face toward the lower inner surface of the through hole 55.

In this manner, when transition occurs from a state in which the external surfaces of the pair of locking hooks 46 face toward the second regions 562 to a state in which the external surfaces of the pair of locking hooks 46 face toward the third regions 563, the pair of pressing portions 57 that are provided between the third regions 563 facing each other move into spaces respectively provided between the central portions of the locking hooks 46 and the left and right sides of the insertion portion 22 of the sensor main body 2 that face the respective locking hooks 46. As described above, each pressing portion 57 is formed in a wedge shape tapered toward the upper side such that a cross-section of the tip end is smaller than the space and a cross-section of its base portion is larger than the space.

Thus, by having the operation member 5 slide upward up to a position at which the base portion of each pressing portion 57 is within the space, as shown in FIGS. 10, 12, and 15, it is possible to press the central portions of the locking hooks 46 outwardly by the respective pressings portion 57. In this state, the locking hooks 46 are unlocked from the locking projection 23 formed on the insertion portion 22 of the sensor main body 2, the sensor main body 2 can be easily detached from the opening 31 of the sensor attachment device 3 by having the sensor main body 2 slide toward the rear side.

In this embodiment, only by the downward displacement of the operation member 5 after the tip ends of the pair of locking hooks 46 are locked to the sensor main body 2 by inserting the sensor main body 2 into the insertion opening 44 with the second regions 562 of the pair of facing surfaces 56 respectively facing toward the external surfaces of the central portions of the pair of locking hooks 46, the central portions of the pair of locking hooks 46 can be pressed inwardly by the first regions 561 of the pair of facing surfaces 56, thereby fixing the sensor main body 2 to the holding member 4. Accordingly, the attachment of the sensor main body 2 is easy in comparison with the conventional configuration in which a nut is screwed onto the sensor main body, then rotated and fastened.

Further, the tip ends of the pair of locking hooks 46 are locked to the sensor main body 2 to provide a temporary joint by inserting the sensor main body 2 into the insertion opening 44 with the second regions 562 of the pair of facing surfaces 56 respectively facing toward the external surfaces of the central portions of the pair of locking hooks 46. Because the sensor main body 2 can be fixed by operating the operation member 5 in such a state provided with the temporary joint, the sensor main body 2 can be attached stably, thereby suppressing an attachment error, in comparison with the conventional configuration in which a nut is rotated to fix the sensor main body.

Further, in this embodiment, by the upward displacement of the operation member 5 with the sensor main body 2 being fixed by pressing the central portions of the pair of locking hooks 46 inwardly by the first regions 561 of the pair of facing surfaces 56, the third regions 563 of the pair of facing surfaces 56 are respectively made to face the central portions of the pair of locking hooks 46. With this configuration, the pressing portion 57 can be inserted into the central portion and the sensor main body 2, thereby pressing the locking hooks 46 outwardly. Thus, because the locking hooks 46 can be easily unlocked from the sensor main body 2 by the suppress strength of the pressing portion 57, the detachment of the sensor main body 2 is easy.

Although, in this embodiment, the example in which the locking hooks 46 are formed to have the curved central is described, the present invention is not limited to such a configuration, and the locking hooks 46 can have portions in a curved shape other than the central portions as long as the locking hooks 46 include curved middle portions between the tip ends and the base portions of the locking hooks, respectively. Further, the locking hooks 46 are not limited to the curved shape, and can have a flexed shape whose middle portions are flexed.

The tip ends of the locking hook 46 are not limited to the configuration that allows the locking of the tip ends to the locking projection 23 formed on the sensor main body 2, and can be a configuration such that the sensor main body 2 is provided with a recess in which the tip ends of the locking hook 46 are locked, or such that the locking is provided by a frictional force between the tip ends of the locking hook 46 and a surface of the sensor main body 2.

In this embodiment, the example in which the operation member 5 is configured to be vertically slidable is described. However, the operation member 5 is not limited to such a configuration and can be configured to slide in any operational direction that inclines in an upward-downward direction, as long as the operation member 5 can slide in a direction that crosses the direction along which the sensor main body 2 is inserted.

Further, in this embodiment, the photo-electrical sensor 1 provided with both of the photo-electrical element and the light emitting element is described. However, the present invention is not limited to such a type of the photo-electrical sensor 1, and can be applied to a photo-electrical sensor only with the photo-electrical element, or a light emitting device for a photo-electrical sensor only with a light emitting element.

Further, in this embodiment, the example is described in which the locking hooks 46 are automatically locked to the sensor main body 2 by inserting the sensor main body 2 into the opening 31 with the external surfaces of the central portions of the pair of locking hooks 46 respectively facing toward the second regions 562 of the facing surfaces 56. However, the present invention is not limited to such an example. For example, the locking hooks 46 are not locked with the external surfaces of the central portions the pair of locking hooks 46 facing toward the second regions 562 of the facing surfaces 56, but the locking hooks 46 can be locked to the sensor main body 2 in regions between the second regions 562 and the first regions 561 by sliding the operation member 5 in the operational direction. In other words, the tip ends of the pair of locking hooks 46 can be locked to the sensor main body 2 by pressing the central portions of the pair of locking hooks 46 inwardly with the facing surfaces 56 of the regions between the second regions 562 and the first regions 561 facing the external surfaces of the central portions of the pair of locking hooks 46.

What is claimed is:

1. A sensor attachment device comprising:
   a holding member provided with an insertion opening into which a sensor main body is inserted, the holding member holding the sensor main body with the sensor main body inserted into the insertion opening; and
   an operation member that is attached to the holding member and fixes the sensor main body to the holding member by being displaced in an operational direction that crosses a direction along which the sensor main body is inserted, wherein
   the holding member is provided with a pair of locking hooks each extending toward the direction along which the sensor main body is inserted, tip ends of the pair of locking hooks being locked to the sensor main body inserted into the insertion opening, and the pair of locking hooks being either curved or flexed to protrude externally so that central portions of the pair of locking hooks are away from the sensor main body inserted into the insertion opening,
   the operation member is provided with a pair of facing surfaces, each facing toward an external surface of each of the central portions of the pair of locking hooks, the pair of facing surfaces each having a first region for fixing the sensor main body and a second region at which a distance between the facing surfaces is larger than that at the first region, wherein
   the pair of facing surfaces respectively includes third regions each provided on an opposite side of the second region with respect to the first region, the tip ends of the pair of locking hooks are capable of being locked to the sensor main body inserted in the insertion opening with the second regions of the pair of facing surfaces respectively facing toward the external surfaces of the central portions of the pair of locking hooks, and the operation member is provided with a pressing portion between the third regions of the pair of facing surfaces that face each other, the pressing portion coming between the central portions and the sensor main body with the third regions respectively facing toward the external surfaces of the central portions of the pair of locking hooks, thereby pressing the central portions outwardly, and
   the sensor main body is capable of being inserted into the insertion opening with the second regions of the pair of facing surfaces respectively facing toward the external surfaces of the central portions of the pair of locking hooks, and the operation member is displaced in the operational direction with the sensor main body being inserted into the insertion opening to have the first regions of the pair of facing surfaces respectively face toward the external surfaces of the central portions of the pair of locking hooks, thereby pressing the central portions of the pair of locking hooks inwardly and fixing the sensor main body to the holding member.

2. A sensor comprising:
   a sensor main body; and
   a sensor attachment device to which the sensor main body is attached, wherein
   the sensor attachment device includes:
   a holding member provided with an insertion opening into which the sensor main body is inserted, the holding member holding the sensor main body with the sensor main body inserted into the insertion opening; and
   an operation member that is attached to the holding member and fixes the sensor main body to the holding member by being displaced in an operational direction that crosses a direction along which the sensor main body is inserted, wherein
   the holding member is provided with a pair of locking hooks each extending toward the direction along which the sensor main body is inserted, tip ends of the pair of locking hooks being locked to the sensor main body inserted into the insertion opening, and the pair of locking hooks being either curved or flexed to protrude externally so that central portions of the pair of locking hooks are away from the sensor main body inserted into the insertion opening,
   the operation member is provided with a pair of facing surfaces, each facing toward an external surface of each of the central portions of the pair of locking hooks, the pair of facing surfaces each having a first region for fixing the sensor main body and a second region at which a distance between the facing surfaces is larger than that at the first region, wherein
   the pair of facing surfaces respectively includes third regions each provided on an opposite side of the second region with respect to the first region, the tip ends of the pair of locking hooks are capable of being locked to the sensor main body inserted in the insertion opening with the second regions of the pair of facing surfaces respectively facing toward the external surfaces of the central portions of the pair of locking hooks, and the operation member is provided with a pressing portion between the third regions of the pair of facing surfaces that face each other, the pressing portion coming between the central portions and the sensor main body with the third regions respectively facing toward the external surfaces of the central portions of the pair of locking hooks, thereby pressing the central portions outwardly, and
   the sensor main body is capable of being inserted into the insertion opening with the second regions of the pair of facing surfaces respectively facing toward the external surfaces of the central portions of the pair of locking hooks, and the operation member is displaced in the operational direction with the sensor main body being inserted into the insertion opening to have the first regions of the pair of facing surfaces respectively face toward the external surfaces of the central portions of the pair of locking hooks, thereby pressing the central portions of the pair of locking hooks inwardly and fixing the sensor main body to the holding member.

3. A light emitting device for a photo-electrical sensor, the device comprising:
   a light emitting device main body;
   a light emitting device attachment member to which the light emitting device main body is attached, wherein
   the light emitting device attachment member includes:
   a holding member provided with an insertion opening into which the light emitting device main body is inserted, the holding member holding the light emitting device main body with the light emitting device main body inserted into the insertion opening; and an operation member that is attached to the holding member and fixes the light emitting device main body to the holding member by being displaced in a operational direction that crosses a direction along which light emitting device main body is inserted, wherein the holding member is provided with a pair of locking hooks each extending toward the direction along which the light emitting device main body is inserted, tip ends of the pair of locking hooks being locked to the light emitting device main body inserted into the insertion opening, and the pair of locking hooks being either curved or flexed to protrude externally so that central portions of the pair of locking hooks are away from the light emitting device main body inserted into the insertion opening, the operation member is provided with a pair of facing surfaces, each facing toward an external surface of each of the central portions of the pair of locking hooks, the pair of facing surfaces each having a first region for fixing the light emitting device main body and a second region at which a distance between the facing surfaces is larger than that at the first region, wherein the pair of facing surfaces respectively includes third regions each provided on an opposite side of the second region with respect to the first region, the tip ends of the pair of locking hooks are capable of being locked to the sensor main body inserted in the insertion opening with the second regions of the pair of facing surfaces respectively facing toward the external surfaces of the central portions of the pair of locking hooks, and the operation member is provided with a pressing portion between the third regions of the pair of facing surfaces that face each other, the pressing portion coming between the central portions and the sensor main body with the third regions respectively facing toward the external surfaces of the central portions of the pair of locking hooks, thereby pressing the central portions outwardly, and the light emitting device main body is capable of being inserted into the insertion opening with the second regions of the pair of facing surfaces respectively facing toward the external surfaces of the central portions of the pair of locking hooks, and the operation member is displaced in the operational direction with the light emitting device main body being inserted into the insertion opening to have the first regions of the pair of facing surfaces respectively face toward the external surfaces of the central portions of the pair of locking hooks, thereby pressing the central portions of the pair of locking hooks inwardly and fixing the light emitting device main body to the holding member.

* * * * *